June 29, 1948.    R. B. COTTRELL    2,444,337
FRICTION ABSORBING DEVICE
Original Filed Feb. 21, 1941

INVENTOR.
Robert B. Cottrell
BY
Atty

Patented June 29, 1948

2,444,337

UNITED STATES PATENT OFFICE 2,444,337

FRICTION ABSORBING DEVICE

Robert B. Cottrell, Chicago, Ill., assignor to American Steel Foundries, Chicago, Ill., a corporation of New Jersey Original application February 21, 1941, Serial No. 379,941, now Patent No. 2,381,404, dated August 7, 1945. Divided and this application March 16, 1944, Serial No. 526,703

24 Claims. (Cl. 267—9)

My invention is directed to a spring assembly and a friction absorbing device in conjunction therewith, sometimes generally designated a snubber.

This application is a division of my co-pending application Serial No. 379,941, filed in the United States Patent Office February 21, 1941 and titled Friction absorbing device, said application being issued as United States Patent No. 2,381,404 on August 7, 1945.

The general object of my invention is to devise a relatively simple form of coil spring and snubber combination in which the parts will be suitable for long wear and convenient for assembly while, at the same time, meeting the various conditions imposed by practical manufacturing requirements.

A specific object of my invention is to devise a snubber having a coil spring and a friction device housed therein wherein relatively large frictional areas may be utilized and in which a compression spring in the form of a rubber pad may be availed of to supply the pressure between the friction surfaces.

In the present modification, my invention comprehends an arrangement comprising a top follower acting as carrier for spaced shoes, a bottom follower having a projecting member interposed between said shoes for frictional engagement therewith, a coil spring between respective followers and resilient means under compression between the carrier and each shoe.

I also contemplate modifications of this generic idea wherein the friction surfaces on the plunger may be parallel or converging in either direction, and further, an arrangement in which the shoe carrier may include not only means for vertically positioning the shoe but also means for preventing its movement out of square with respect to the friction plunger against which it operates.

Figure 1:
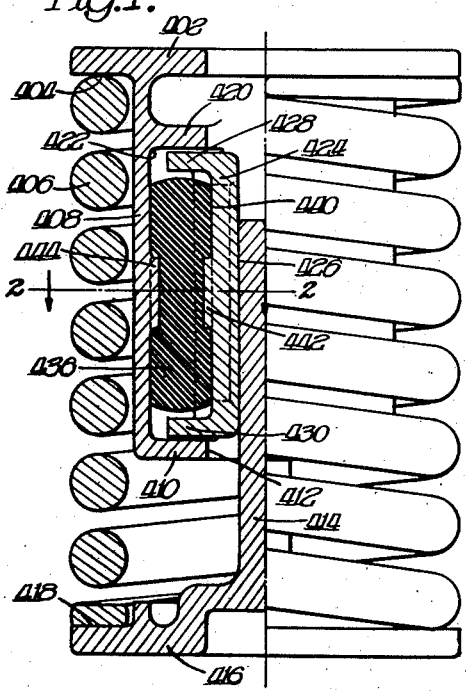
Figure 1 is a side elevation of one modification of my invention, half in section, the section being taken substantially in the radial plane at right angles to the friction shoes and as indicated by the line 1—1 of Figure 2.
Figure 2:
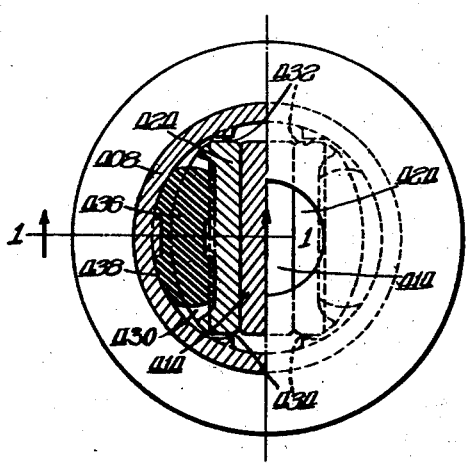
Figure 2 is a top plan view, half in section, of the structure shown in Figure 1, the section being taken substantially in the plane indicated by the horizontal line 2—2 of Figure 1.

Describing in detail the modification of Figures 1 and 2, the top follower 402 affords an annular seat as at 404 for the coil spring 406, said top follower having an integral barrel or housing 408 with the bottom wall 410 having a transverse slot 412 within which may project the friction panel 414 in the form of a rectangular tonguelike member or plunger projecting upwardly centrally of the bottom follower 416, said bottom follower affording a seat as at 418 for the opposite end of the spring 406. Adjacent the base of the top follower 402 and within the barrel 408 at each side thereof may be formed a horizontal flange 420 defining with the bottom wall 410 a cavity or recess 422 within which may be slidably received the friction shoe 424, said friction shoe being recessed and having a back wall with a flat friction face having engagement as at 426 with the friction face on the adjacent side of the tongue 414. At the top of the friction shoe 424 may be formed an arcuate flange 428 and at the bottom thereof may be formed a similar arcuate flange 430, said flanges serving to position said shoe against relatively vertical movement with respect to the top follower. Relative lateral movement with respect to said follower may be prevented by the vertical flanges formed thereon for abutment with the opposite vertical edges of each shoe as seen at 432 and 434 in the sectional view of Figure 2. Confined within each cavity 422 is a compression spring in the form of a rubber pad 436, the arcuate face of which may seat as at 438 against the barrel 408, and the opposite face of which may have flat engagement as at 440 against the friction shoe 424, positioning means being afforded on said shoe and said barrel for said rubber spring as at 442 and 444 respectively.

In the modification of Figures 1 and 2 just described, the friction developed is substantially constant on the upward and downward stroke inasmuch as the compression of the rubber spring 436 is constant throughout the stroke.

Figure 3:
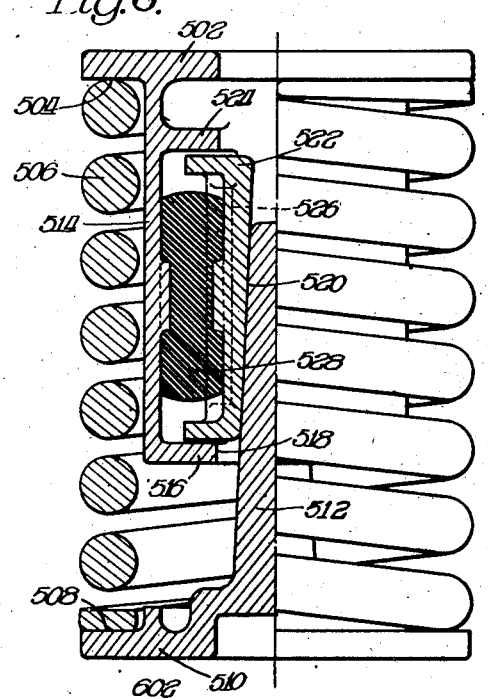
Figure 3 shows a structure generally similar to that of Figure 1 but differs therefrom in affording tapering friction surfaces, instead of vertical, for the shoes to bear against.

The modification of Figure 3 differs from that of Figure 1 only in that the friction surfaces are tapered instead of in spaced parallel arrangement. In the modification of Figure 3, the top follower 502 affords a seat as at 504 for the coil spring 506, the opposite end of which may seat as at 508 against the bottom follower 510. Centrally formed on the bottom follower 510 is the upwardly projecting friction tongue 512 in the form of a generally rectangular panel extending transversely across said bottom follower and tapering from bottom to top as best seen in the sectional view of Figure 3. Integrally formed with the top follower 502 is the shoe carrier 514, a barrel-like structure having at its extremity the wall 516 with the transverse slot 518 within which may project the beforementioned friction tongue 512 for frictional engagement as at 520 with each friction shoe 522. The general form of the friction shoe 522 is similar to that of the friction shoe 424 of the previous modification except that the back wall thereof is tapered to an angle complementary to that of the tapered engaging surface of the friction tongue 512. Each friction shoe 522 may be restrained against relative movement with respect to the top follower by confinement between the horizontal flange 524 formed on said follower adjacent the base thereof and the before-mentioned wall 516 as well as between vertical flanges 526, 526 engaging each side of the shoe. Between each shoe 522 and the opposite wall of the housing 514 may be compressed the rubber spring 528, said spring being positioned with respect to the shoe and housing in manner similar to the previous modification.

In the modification of Figure 3 there is a steady increment of friction as the device is compressed, and conversely, a decrease in the friction as release takes place.

Figure 4:
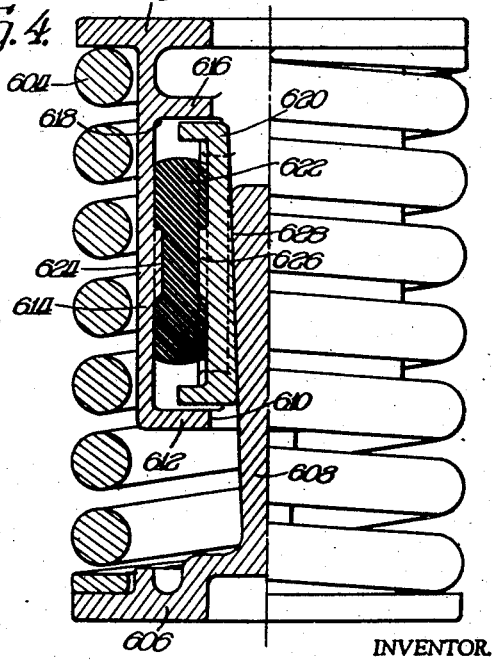
Figure 4 is generally similar to that of Figure 3 except that the taper of the friction surfaces is reversed, converging in a downward direction instead of in an upwardly direction.

The modification shown in Figure 4 is generally similar to that of Figure 3 but reversely arranged with respect to the taper of the friction surfaces so that an increment of friction takes place on the upward or release stroke. This modification of Figure 4 comprises the top follower 602, the coil release spring 604, the bottom follower 606 with the friction tongue 608 upwardly projecting therefrom and extending into the transverse slot 610 formed in the bottom wall 612 of the housing 614, said housing being integrally formed with the top follower 602 and having the spaced horizontal wall 616 defining with the wall 612 the shoe cavity 618 within which may slidably extend the friction shoe 620. Between the friction shoe 620 and the housing 614 may be compressed the rubber pad 622, said rubber pad being positioned with respect to said housing and said shoe by lugs 624 and 626 respectively. The friction face of the shoe 620 may have flat engagement as at 628 with the adjacent surface of the tongue or friction member 608, the taper on the face of said shoe being complementary in form to the taper on the surface of said tongue 608. In this modification, as is readily apparent, an increment of friction takes place upon the upward or release stroke and a gradual diminution of friction takes place on the downward stroke.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a friction device, a top follower assembly, a bottom follower, and a compression spring therebetween, said assembly comprising a carrier projecting within said spring and supporting spaced shoes, resilient means associated with each shoe, said bottom follower having a friction panel projecting within said spring with upwardly converging friction faces at opposite sides thereof, said panel being clamped between said shoes intermediate said resilient means, said carrier having vertical and horizontal ledges retaining said shoes in normal vertical position and preventing relative vertical movement between said carrier and shoes, and positioning means for each resilient means on the abutting shoe and an adjacent wall of said carrier.

2. In a friction device, a top follower assembly, a bottom follower, and a compression spring therebetween, said assembly comprising a carrier projecting within said spring and supporting spaced shoes, resilient means associated with each shoe, said bottom follower having a friction panel projecting within said spring with upwardly diverging friction faces at opposite sides thereof, said panel being clamped between said shoes intermediate said resilient means, said carrier having vertical and horizontal ledges retaining said shoes in normal vertical position and preventing relative vertical movement between said carrier and shoes, and positioning means for each resilient means on the abutting shoe and an adjacent wall of said carrier.

3. In a friction device, a top follower assembly, a bottom follower, and a compression spring therebetween, said assembly comprising a carrier projecting within said spring and supporting spaced shoes, resilient means associated with each shoe, said bottom follower having a friction panel projecting within said spring with upwardly diverging friction faces at opposite sides thereof, said panel being clamped between said shoes intermediate said resilient means, said carrier having vertical and horizontal ledges retaining said shoes in normal vertical position and preventing relative vertical movement between said carrier and shoes.

4. In a friction device, a top follower assembly, a bottom follower, and a compression spring therebetween, said assembly comprising a carrier projecting within said spring and supporting spaced shoes, resilient means associated with each shoe, said bottom follower having a friction panel projecting within said spring with upwardly converging friction faces at opposite sides thereof, said panel being clamped between said shoes intermediate said resilient means, said carrier having vertical and horizontal ledges retaining said shoes in normal vertical position and preventing relative vertical movement between said carrier and shoes.

5. In a snubber, telescoping followers, a compression spring therebetween, the outer follower comprising spaced interior recesses and the inner follower presenting a friction member surrounded by said spring and extending between said recesses, each of said recesses having housed therein a friction shoe slidably engaging the top and bottom thereof permitting relative lateral movement between said shoe and outer follower and limiting relative vertical movement therebetween, and resilient means between said outer follower and said shoes for actuating said shoes laterally of said follower and into frictional engagement with the adjacent sides of said member.

6. A snubber comprising spaced followers, a compression spring therebetween, one of said followers presenting within said spring a friction panel with friction faces converging toward the other of said followers, the other of said followers supporting within said spring spaced shoes for engagement with said faces and resilient means between each shoe and its support, and telescoping interengaging flanges on each shoe and the adjacent support operable substantially to prevent relative vertical movement and to permit relative lateral movement therebetween.

7. A snubber comprising spaced followers, a compression spring therebetween, one of said followers presenting within said spring a friction panel with friction faces diverging toward the other of said followers, the other of said followers supporting within said spring spaced shoes for engagement with said faces, resilient means between each shoe and its support, and telescoping interengaging flanges on each shoe and the adjacent support operable substantially to prevent relative vertical movement and to permit relative lateral movement therebetween.

8. In a fricton absorbing device, spaced followers, a compression spring therebetween, one of said followers having means projecting within said spring supporting spaced friction shoes, a resilient member between each shoe and the adjacent support means, the other of said followers having a friction panel clamped between said shoes intermediate said members, and interengaging means on said shoes and their supporting follower substantially preventing relative vertical movement and misalignment of said shoes with respect thereto.

9. In a snubber, spaced followers, a release spring therebetween, a friction tongue on one of said followers extending within said spring with downwardly diverging plane friction surfaces on opposite sides thereof, a carrier integrally formed with the other of said followers supporting friction shoes in engagement with said surfaces respectively, said carrier having spaced vertical and horizontal abutment means receiving said shoes therebetween and retaining said shoes in normal vertical position and preventing relative vertical movement between said carrier and shoes, and resilient means under compression between said carrier and each of said shoes.

10. In a snubber, spaced followers, a release spring therebetween, a friction tongue on one of said followers extending within said spring with tapering plane friction surfaces on opposite sides thereof, a carrier integrally formed with the other of said followers supporting friction shoes in engagement with said surfaces respectively, said carrier having spaced vertical and horizontal abutment means receiving said shoes therebetween and retaining said shoes in normal vertical position and preventing relative vertical movement between said carrier and shoes, and resilient means under compression between said carrier and each of said shoes.

11. In a snubber, spaced followers, a release spring therebetween, a friction tongue on one of said followers extending within said spring with upwardly diverging plane friction surfaces on opposite sides thereof, a carrier integrally formed with the other of said followers supporting friction shoes in engagement with said surfaces respectively, said carrier having spaced vertical and horizontal abutment means receiving said shoes therebetween and retaining said shoes in normal vertical position and preventing relative vertical movement between said carrier and shoes, and resilient means under compression between said carrier and each of said shoes.

12. In a friction device, a top follower assembly, a bottom follower, and a compression spring therebetween, said assembly comprising a carrier projecting within said spring and comprising spaced integral rigid means slidably supporting spaced shoes therebetween, resilient means compressed between each shoe and said carrier, said bottom follower having a friction panel projecting within said spring with friction faces at opposite sides thereof diverging toward said assembly, said panel being clamped between said shoes intermediate said resilient means.

13. In a friction device, a top follower assembly, a bottom follower, and a compression spring therebetween, said assembly comprising a hollow carrier projecting within said spring and presenting spaced substantially horizontal internal surfaces slidably engaging spaced friction shoes received therebetween, resilient means compressed between each shoe and said carrier, and a friction member projecting from said bottom follower and having friction faces at opposite sides thereof converging toward said assembly, said member being clamped between said shoes intermediate said resilient means.

14. A snubber having spaced followers, a release spring therebetween, a friction tongue integrally formed with one of said followers extending within said spring, plane friction surfaces angularly arranged with respect to each other on opposite sides of said tongue, friction shoes supported from the other of said followers within said spring in engagement with said surfaces respectively, and resilient means interposed between said other follower and said shoes and urging said shoes into engagement with said surfaces, the support for said shoes on said other follower comprising spaced rigid means fixed to the latter and in engagement with opposite ends of said shoes for preventing relative vertical movement between said shoes and said other follower.

15. A snubber having spaced followers, a release spring therebetween, a friction tongue surrounded by said spring and integrally formed with one of said followers, plane friction surfaces on opposite sides of said tongue, said surfaces being angularly arranged with respect to each other, friction shoes supported from the other of said followers in engagement with said surfaces respectively, resilient means compressed between said shoes and their supporting follower for urging said shoes into engagement with said surfaces, and interengaging means on said shoes and said supporting follower substantially preventing relative vertical movement and misalignment of said shoes with respect thereto.

16. A snubber comprising telescoping followers, spaced friction surfaces supported from the inner follower, said surfaces being angularly arranged with respect to each other, friction shoes supported from the outer follower in engagement with said surfaces respectively, resilient means urging said shoes into engagement with said surfaces, said resilient means being housed in said shoes, interlocking means on said outer follower for said shoes, said interlocking mean having engagement with opposite ends of said shoes, and a compression spring surrounding said followers and opposing movement of the same toward each other.

17. In a snubber, telescoping followers, a compression spring surrounding said followers and opposing movement of said followers toward each other, a pair of shoes supported from the outer follower within said spring, friction surfaces on opposite sides of the inner follower in engagement with said shoes respectively, means on said outer follower engaging said shoes for preventing relative vertical movement therebetween and resilient means compressed between said outer follower and said shoes for urging said shoes into engagement with said surfaces, said resilient means being housed within said shoes.

18. In a snubber, telescoping followers, a compression spring surrounding said followers and opposing movement of said followers toward each other, a pair of shoes supported from the outer follower within said spring, friction surfaces on opposite sides of the inner follower in engagement with said shoes respectively, resilient means compressed between said outer follower and said shoes for urging said shoes into engagement with said surface, said resilient means being housed within said shoes, and telescoping flanges on each shoe and said outer follower operable substantially to prevent relative vertical movement and permit relative lateral movement therebetween.

19. In a snubber, telescoping followers, a compression spring surrounding said followers and opposing movement of said followers toward each other, a pair of shoes supported from the outer follower within said spring, friction surfaces on opposite sides of the inner follower in engagement with said shoes respectively, and resilient means compressed between said outer follower and said shoes for urging said shoes into engagement with said surfaces, said resilient means being housed within said shoes, said shoes and said outer follower having engagement with each other for substantially preventing relative vertical movement and permitting relative lateral movement therebetween.

20. In a snubber, telescoping followers, a compression spring therebetween, a carrier integrally formed with the outer follower and projecting within said spring, spaced shoes supported by said carrier, resilient means housed in said shoes and compressed between said carrier and the associated shoes, interlocking means on said carrier for said shoes and having engagement with opposite ends of said shoes, the inner follower projecting within said spring and having plane friction surfaces on opposite sides thereof engaging said shoes respectively.

21. In a snubber, telescoping followers, a compression spring therebetween, a carrier integrally formed with the outer follower and projecting within said spring, spaced shoes supported by said carrier, resilient means housed in recesses in said shoes and compressed between said carrier and the associated shoe, the inner follower projecting within said spring and having angularly arranged friction surfaces on opposite sides thereof engaging said shoes respectively, each of said resilient means comprising a pad of rubberlike material spaced from the edges of the associated recess to permit flow thereof during relative movement of said followers.

22. In a snubber, telescoping followers, a compression spring therebetween, a carrier integrally formed with the outer follower and projecting within said spring, spaced shoes supported by said carrier, resilient means housed in said shoes and compressed between said carrier and the associated shoe, the inner follower projecting within said spring and having friction surfaces on opposite sides thereof engaging said shoes respectively and converging toward said outer follower, and telescoping flanges on each shoe and said carrier operable to prevent relative vertical movement and permit relative lateral movement therebetween.

23. In a snubber, telescoping followers, a compression spring therebetween, a carrier integrally formed with the outer follower and projecting within said spring, spaced shoes supported by said carrier, resilient means housed in said shoes and compressed between said carrier and the associated shoe, the inner follower projecting within said spring and having friction surfaces on opposite sides thereof engaging said shoes respectively and diverging toward said outer follower, and telescoping flanges on each shoe and said carrier operable to prevent relative vertical movement and permit relative lateral movement therebetween.

24. In a snubber, telescoping followers, a compression spring therebetween, a carrier integrally formed with the outer follower and projecting within said spring, spaced shoes supported by said carrier, resilient means housed in said shoes and compressed between said carrier and the associated shoe, the inner follower projecting within said spring and having angularly arranged friction surfaces on opposite sides thereof engaging said shoes respectively, and interengaging means on said shoes and said carrier slidably interlocking the same and limiting relative vertical movement and permitting relative lateral movement therebetween.

ROBERT B. COTTRELL.

REFERENCES CITED

The following references are of record in the file of this patent:

UNITED STATES PATENTS

| Number | Name | Date |
|---|---|---|
| 207,020 | Dick et al. | Aug. 13, 1878 |
| 1,101,993 | Bowen | June 30, 1914 |
| 1,696,478 | Hall | Dec. 25, 1928 |
| 1,707,490 | O'Connor | Apr. 2, 1929 |
| 1,713,914 | O'Connor | May 21, 1929 |
| 1,923,894 | Sproul | Aug. 22, 1933 |
| 1,938,715 | Miner | Dec. 12, 1933 |
| 2,141,767 | Camp | Dec. 27, 1938 |
| 2,265,392 | Olander | Dec. 9, 1941 |
| 2,295,556 | Flesch | Sept. 15, 1942 |

FOREIGN PATENTS

| Number | Country | Date |
|---|---|---|
| 378,410 | Great Britain | Aug. 4, 1932 |